(12) United States Patent
Guan

(10) Patent No.: US 10,145,724 B2
(45) Date of Patent: Dec. 4, 2018

(54) CASE HOLDER WITH WEIGHING SENSOR

(71) Applicant: Shenzhen Lante Er Electronics, Company Limited, Shenzhen, Guangdong (CN)

(72) Inventor: Xuefeng Guan, Shenzhen (CN)

(73) Assignee: Shenzhen Lanter Er Electronics,Company Limited, Shenzhen, Guangdong (CN)

( * ) Notice: Subject to any disclaimer, the term of this patent is extended or adjusted under 35 U.S.C. 154(b) by 31 days.

(21) Appl. No.: 15/379,432

(22) Filed: Dec. 14, 2016

(65) Prior Publication Data

US 2017/0363460 A1 Dec. 21, 2017

(30) Foreign Application Priority Data

Jun. 15, 2016 (CN) .......................... 2016 1 0427024

(51) Int. Cl.
*A45C 13/28* (2006.01)
*G01G 19/58* (2006.01)

(52) U.S. Cl.
CPC ............ *G01G 19/58* (2013.01); *A45C 13/28* (2013.01)

(58) Field of Classification Search
CPC ................................ G01G 19/58; A45C 13/28
USPC ....................................................... 177/245
See application file for complete search history.

(56) References Cited

U.S. PATENT DOCUMENTS

| | | | | |
|---|---|---|---|---|
| 7,265,302 B2 * | 9/2007 | Keech | ..................... | A45C 15/00 177/131 |
| 7,692,107 B1 * | 4/2010 | Shotey | ................... | G01G 19/58 177/131 |
| 8,575,500 B1 * | 11/2013 | Genet, Sr. | .............. | G01G 19/58 177/148 |
| 8,853,565 B2 * | 10/2014 | Kritzler | ................... | A45C 13/28 177/126 |
| 2007/0007048 A1 * | 1/2007 | Gill | ........................ | G01G 19/58 177/131 |

(Continued)

FOREIGN PATENT DOCUMENTS

CN 201803773 * 4/2011

*Primary Examiner* — J M Saint Surin
(74) *Attorney, Agent, or Firm* — Raymond Y. Chan; David and Raymond Patent Firm

(57) ABSTRACT

A case holder with weighing sensor that weighs accurately, has a fixing base of a weighing sensor built in the holder, and ensures the fixed end and the loading end of the weighing sensor meet weighing principle. It includes a grip and a lifting arrangement arranged at two ends of the lower surface of the grip and allowed to pass through a case surface to be fixedly connected with a stressed plate below the case surface. A neutral zone of the grip provides a fixing base for arranging a weighing sensor. A fixed end of the weighing sensor is fixedly connected on the fixing base with screw. A loading end of the weighing sensor includes a rigid and structurally closed lifting bushing fixedly connected thereon. The lifting bushing is arranged around the grip, the fixing base, and the weighing sensor and has two ends separately arranged to the corresponding lifting arrangement. The inner wall of the lifting bushing and the grip have a gap therebetween. Contrasting to the prior art, the present invention allows the relationship of the loading end and the fixed end of the weighing sensor to stick to the weighing principle. Therefore, cases that use the holder of the present invention can weight very accurately.

14 Claims, 4 Drawing Sheets

(56) References Cited

U.S. PATENT DOCUMENTS

2007/0205025 A1\* 9/2007 Taha ..................... A45C 3/00
 177/245

\* cited by examiner

CASE HOLDER WITH WEIGHING SENSOR

CROSS REFERENCE OF RELATED APPLICATION

This is a non-provisional application that claims claims priority under 35 U.S.C. 119(a-d) to Chinese application number CN201610427024.4, filed Jun. 15, 2016. The aforementioned patent applications are hereby incorporated by reference in their entireties.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a holder for a case luggage, and more particularly to a case holder that combines a weighing sensor with a holder.

Description of Related Arts

Most of the luggage, cases, handbags or backpacks with weighing function in the market include the weighing sensor and handle arranged separately. More particularly, the weighing sensor is commonly mounted on the outer surface of the luggage having a retention end and a gravity load end arranged in such a manner that when the luggage is lifted up, the force applied to the retention end and the gravity load would be shown through a displaying device.

However, when a luggage is overloaded, its outer surface would be twisted or slanted no matter the outer surface is made of a hard material or soft material. As a result, the weighing sensor coupled with the outer surface could become twisted and consequently lend to an inaccurate measurement. Moreover, a luggage has to go through a series of loading tests before shipping out of the factory. These tests include shock resistance test, distortion resistance test, and etc. Accordingly, the test loading is several times of the rated loading of the luggage, so as to ensure the quality of the luggage. However, the handle of the luggage and the weighing sensor would also suffer a relatively large load. Therefore, high requirements for the material features and qualities, manufacturing costs, and assembly techniques all have to be considered in the design of the handle, so as to ensure the shockproof and anti-twisting abilities and anti-breaking strength of the handle bar and weighing sensor.

Commonly in the prior art, it is inevitable that the structure of the luggage would be distorted to some extent after taking the above tests, which results in deviation of the weight sensor. Moreover, no matter one sensor or two sensors arrangement is applied, the structure of the weighing sensor and the procedures of wrapping it with the outer surface of the luggage are complicated that it is hard to keep the consistency of the assembly and the assembly efficiency is quite low as well.

1. A China utility model patent, entitled luggage holding handle device with electronic tag and weighing function (patent number: 201120440187.9), discloses a technical solution where the weighing sensor is coupled with the handle of the luggage instead of being separately arranged. However, it still has the following shortcomings:

First, when a user grips on the handle arrangement to lift the luggage up by hand, his/her palm is fully attached to the base of the handle arrangement where the weighing sensor is connected thereto, while the two sides of his palm can easily touch the sidewall of outer casing of the handle arrangement as his thumb contacts the top side of outer casing of handle arrangement. As mentioned before, the weighing sensor has a retention end and a loading end. The retention end is affixed to the outer casing of the handle arrangement and the loading end is mounted on the base of the handle arrangement. Therefore, when the palm touches the loading end while the thumb contacts the retention end, it would cause an inaccurate weighing operation according to the weighing principle of the weight sensor that both the retention end and the loading end of the weighing sensor should be kept contactless. As a result, the weighing sensor of this type of luggage is inaccurate.

Second, when the luggage is overloaded, the base of the handle arrangement moves a great deal vertically pushing the displaying device which is mounted on the top side of the outer casing of the handle arrangement to be twisted. Gradually, the displaying device would detach from the outer casing, which eventually makes the circuit of the displaying device break off and fail. In fact, it is very impractical to mount the displaying device on the top side of the outer casing of the handle arrangement.

Third, the handle arrangement is made of hard material which is non-deformable. The hard-material handle arrangement could merely be applied to the hard-material or metal-material luggage. However, popular handle arrangements in the market are mostly made of soft materials. Moreover, the hard-material handle arrangement erected from the outer surface of the luggage would not only affect the esthetic appearance, but also be easily collided and broken.

2. A China utility patent, entitled a handle arrangement with weighing sensor (patent number: 2010100428002.0), also discloses a technical solution where the weighing sensor is coupled with the handle. However, it has the following drawbacks:

First, the loading end of the weighing sensor is attached to the handle of the luggage through a crank arrangement and the handle is made of hard material. Such connection is easily distorted under a relative large load. Consequently, the retention end may be attached to the loading end of the weighing sensor, which causes a weighing deviation.

Second, the handle arrangement is embodied as a non-deformable configuration made of hard material, which disadvantages are the same as the third point mentioned for the above first patent.

Third, there are some disadvantages like what were mentioned in the second point for the first prior art patent above.

Accordingly, besides of the structural defects, the common problem according to the analysis of the above two China patents is using hard material to make the handle arrangement. Based on market research and feedback from the luggage suppliers, the hard-material handle arrangement is hard to promote.

Recently, a great amount of soft-material luggages with soft-material handles are developed and sold. Most the weighing luggages apply soft-material and bendable handle and soft-material outer surface. The circuit assembly is no longer placed within the handle and the weight sensor is usually provided on or under the outer surface of the luggage. Accordingly, when the luggage is overloaded, the outer surface will be distorted and the weighing sensor mounted on or under the outer surface will be twisted correspondingly, which leads to an inaccurate and unstable weighing measurement. Besides, the soft-material outer surface is deformed even worse compared with the outer surface made of hard-material. Moreover, such complex structure arrangement has to bear a relatively high cost.

SUMMARY OF THE PRESENT INVENTION

A technical issue that the present invention aims to solve is to provide a case holder with weighing sensor that weighs accurately, has a fixing base of a weighing sensor built in the holder, and ensures the fixed end and the loading end of the weighing sensor meet weighing principle.

In order to solve the above technical issue, the technical solutions that the present invention applies are as follows.

A case holder with weighing sensor according to the present invention comprises a grip and a lifting arrangement arranged at two ends of the lower surface of the grip and allowed to pass through a case surface to be fixedly connected with a stressed plate below the case surface, wherein a neutral zone of the grip provides a fixing base made of hard material for arranging a weighing sensor, wherein a fixed end of the weighing sensor is fixedly connected on the fixing base with screw, wherein a loading end of the weighing sensor comprises a rigid and structurally closed lifting bushing fixedly connected thereon, wherein the lifting bushing is arranged around the grip, the fixing base, and the weighing sensor and has two ends separately arranged to the corresponding lifting arrangement, wherein the inner wall of the lifting bushing and the grip have a gap therebetween, wherein the case holder further comprises a guiding path and a connecting wire provided below the grip and between the lifting arrangement and the stressed plate and adapted for transmitting weighing signal of the weighing sensor to external displaying device.

The lifting bushing is made of metal or hard plastic material and has an elliptical shape, round shape, or combined shape of arc and rectangle for the cross-sectional shape thereof perpendicular to the axis thereof, wherein the lifting bushing has a detachable upper portion and lower portion, wherein the attaching sides of the upper portion and the lower portion symmetrically have screw orifices for the connection thereof with screw, wherein a median position of the lower portion has a loading hole adapted for fixing the lifting bushing on the weighing sensor with screw.

The weighing sensor has a long rectangular shape and the two loading ends thereon are at the middle thereof and the two fixed ends thereon are respectively at the two ends thereof.

The weighing sensor is long rectangular shaped and the two loading ends thereon are respectively at the two ends thereof and the two fixed ends thereon are at the middle thereof.

The outer surface of the lower portion of the lifting bushing further provides a layer of handguard plate made of silicone.

The lifting arrangement comprises a handle foot integrally formed with the grip and a hollow sleeve allowing the handle foot to be buried and hidden therein, wherein the main surface of the handle foot has a pin perpendicular thereto and extending outwards, wherein the side wall of the hollow sleeve provides a slant linear guide groove at the position corresponding to the pin, wherein the pin is placed through the guide groove and allowed to slide back and forth along the direction of the long side of the guide groove, wherein the bottom side of the hollow sleeve has a screw orifice for fixing the hollow sleeve on the stressed plate with screw.

The fixing base and the grip are fixedly connected by embedding technique, injection molding technology, overmolding technology, or screw fastening structure.

The grip is made of soft or hard material.

The gap is at least 1 millimeter (mm) wide.

Another case holder with weighing sensor of the present invention comprises a grip and a lifting arrangement arranged at an outer end of the lower surface of the grip and allowed to pass through a case surface to be fixedly connected with a stressed plate below the case surface, wherein the grip comprises a separately arranged left handle and right handle, wherein the lower surfaces of the inner ends of the left handle and the right handle have fastening screw holes, wherein the case holder further comprises a weighing sensor connected between the left handle and the right handle, wherein two fixed ends of the weighing sensor are respectively at the two ends of the weighing sensor and two loading ends thereof are at the middle thereof, wherein the fixed end has screw holes thereon as the position corresponding to the fastening screw hole, wherein the weighing sensor is fixedly connected on the grip by passing screws through the screw holes, wherein a loading end of the weighing sensor comprises a rigid and structurally closed lifting bushing fixedly connected thereon, wherein the lifting bushing is arranged around the grip and the weighing sensor and has two ends separately arranged to the corresponding lifting arrangement, wherein the inner wall of the lifting bushing and the grip have a gap therebetween, wherein the case holder further comprises a guiding path and a connecting wire provided below the grip and between the lifting arrangement and the stressed plate and adapted for transmitting weighing signal of the weighing sensor to external displaying device.

Contrasting to the prior arts, the present invention applies the technology of overmolding or screw fastening in the middle of the grip of the case holder to internally place a rigid fixing base for supporting the weighing sensor. Then, the fixed end on the weighing sensor is fixedly connected on the fixing base and a rigid and structurally closed lifting bushing is arranged around the weighing sensor, the fixing base, and the grip. The lower portion of the lifting bushing is fixedly connected with the loading end of the weighing sensor. The inner wall of the lifting bushing is contactless to the grip. This structure allows the relationship of the loading end and the fixed end of the weighing sensor to stick to the weighing principle. In other words, the lifting bushing connected with the loading end will always be contactless to the grip connected with the fixed end. Therefore, the weighing result of the case holder is very accurate.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
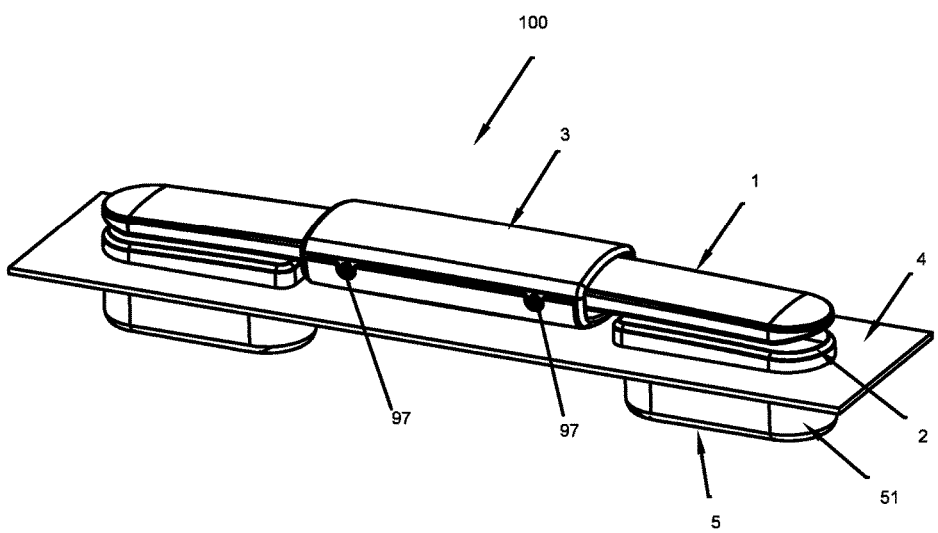
FIG. 1 is a perspective view of a case holder according to a first preferred embodiment of the present invention.

Referring to FIG. 1, the case holder 100 with weighing sensor 7 according to the present invention is adapted for soft and hard portable containers, such as cases, handbags, or backpacks, which load items.

Embodiment 1

Figure 2:
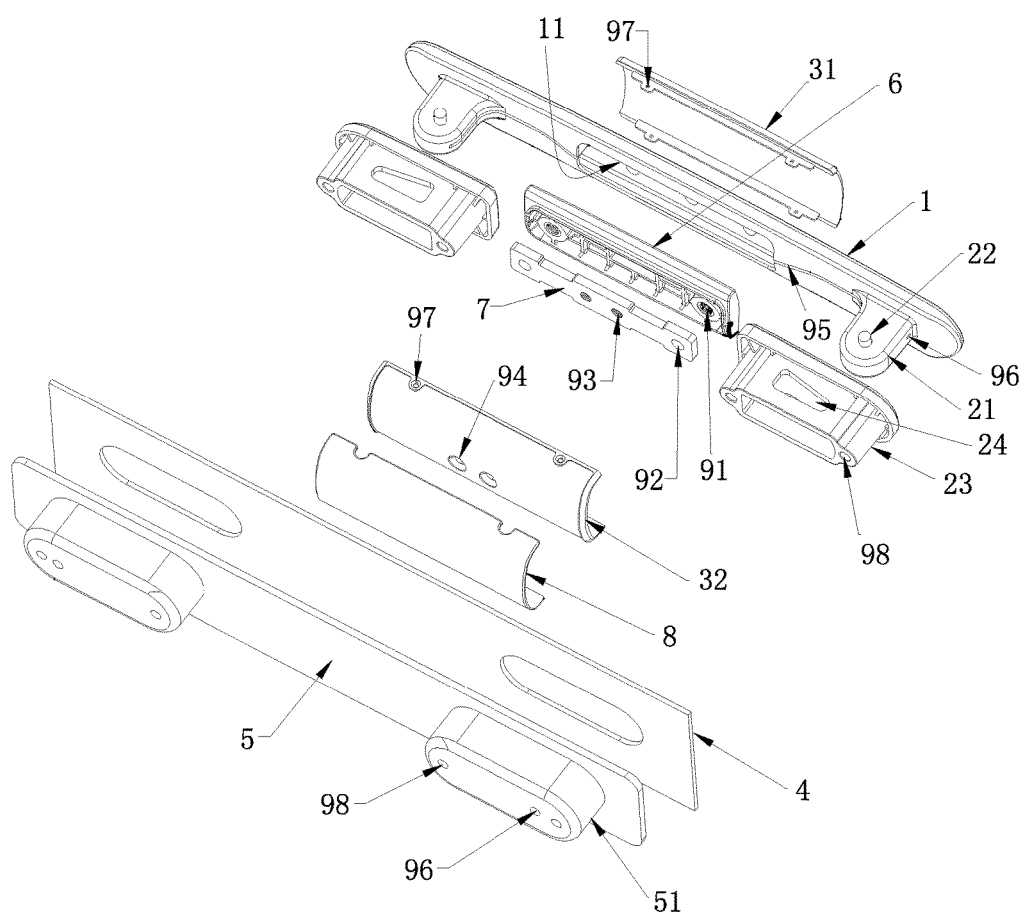
FIG. 2 is an exploded perspective view of the case holder according to the above first embodiment of the present invention.

Referring to FIG. 2, the case holder 100 according to the present invention is composed of a grip 1, a lifting arrangement 2 arranged at the two ends of the lower surface of the grip 1, a weighing sensor fixed on the grip 1, and a lifting bushing 3 made of rigid material. The case holder 100 is used with a standard package of regular holder. The standard package comprises a lifting arrangement 2, a case surface 4, and a stressed plate 5 arranged below the case surface 4. The structural setup of the weighing sensor and the lifting bushing 3 are both original in the industry.

The grip 1 is made of soft or hard material(s). Preferably, the present invention uses soft and bendingly durable plastic material to make it.

The weighing sensor unit can be composed of a separately arranged fixing base 6 that is made of rigid material and a long rectangular shaped weighing sensor 7.

The fixing base 6 is made of hard material, which is not limited to metal or hard plastic material. The present invention prefers fixing base 6 to be hard board made of metal or hard plastic material. The fixing base 6 is fixedly connected on the middle of the lower surface of the grip 1 by embedding technique, injection molding technology, overmolding technology, or screw fastening structure.

Preferably, the present invention applies overmolding technology to mount the premade fixing base 6 into the chamber 11 arranged in the middle of the grip 1. The fixing base 6 provides positioning screw holes 91 thereon for fixing the weighing sensor 7. The positioning screw holes 91 are a closed bore having its opening exposed on the lower surface of the grip 1.

The weighing sensor 7 is long rectangular shaped and comprises a pair of strain gauges. Each strain gauge corresponds to a loading end and a fixed end, wherein the position of the strain gauge is between the corresponding loading end and fixed end. Each fixed end has a positioning through hole 92 therein corresponding to the positioning screw holes 91 on the fixing base 6. Each loading end has a loading screw hole 93 therein. The loading screw hole 93 is preferably a closed bore having its opening on the lower surface of the weighing sensor 7.

The two loading ends on the weighing sensor 7 of the present invention are adjacently arranged at the middle of the weighing sensor 7 and the two fixed ends on the weighing sensor 7 are respectively at the two ends thereof. Such structural arrangement makes the straining of the elastic body of the weighing sensor 7 smaller. The gap between the weighing sensor 7 and the lower portion of the lifting bushing 3 that is connected with the loading end is smaller as well. Therefore, it is favorable for making the lifting bushing 3 smaller, so as to achieve a compact and artistic holder.

It utilizes screw or bolt to pass through the positioning through holes 92 on the weighing sensor 7 and screw in the positioning screw holes 91 on the fixing base 6, such that the fixed end of the weighing sensor 7 is fixedly connected with the fixing base 6.

The lifting bushing 3 is made of metal or hard plastic material. The cross-sectional shape of the lifting bushing 3 perpendicular to the axis of the lifting bushing 3 is an elliptical shape, round shape, or combination of arc and rectangle. The lifting bushing 3 is made of rigid material and is structurally closed. The lifting bushing 3 can have an integral structure.

To ease the installation, the lifting bushing 3 according to the present invention preferably comprises two parts, an upper portion 31 and a lower portion 32. The upper portion 31 and the lower portion 32 can be coupled through screw, bolt, or buckle structure.

Preferably, according to the present invention, the attaching sides of the upper portion 31 and the lower portion 32 symmetrically have a plurality of screw holes 97, such that the upper portion 31 and the lower portion 32 can be tight connected by screws.

The lower portion 32 has a loading hole 94 on the median thereof at the position corresponding to the loading screw hole 93 for fixing the lifting bushing 3 on the weighing sensor 7 with screw or bolt.

After the lifting bushing 3, the weighing sensor unit, and grip 1 are tight connected, the weighing sensor unit and the grip 1 are both passingly placed in the lifting bushing 3, or, in other words, the lifting bushing 3 is arranged around the grip 1, the fixing base 6, and the weighing sensor 7. Besides, the lifting bushing 3 is only connected with and contacted the loading end on the above, while the rest parts thereof remain contactless to the grip 1. In other words, there is a gap between the inner wall of the lifting bushing 3 and the grip 1 and the distance of the gap is not less than 1 mm. Therefore, the fixed end is separately and contactlessly arranged to the loading end of the weighing sensor 7, which completely meet the requirement of the weighing principle.

In order to ensure that the lifting bushing 3 will not contact the grip 1, the length of the lifting bushing 3 should be less than the length of the maximum operational portion for the grip 1 held by hand, which is, in other words, the length of the maximum operational portion that the grip 1 can possibly be touched by hand. Preferably, according to the present invention, the length of the lifting bushing 3 will not be shorter than the length of the fixing base 6.

The lifting arrangement 2 has two parts that are respectively arranged at the two end of the grip 1 and connected to the case. They are composed of a handle foot 21 that is also called handle bump and a hollow sleeve 23 that is also called handle slider. Usually, the handle foot 21 and the grip 1 are integrally formed. The handle foot 21 and the hollow sleeve 23 are separately arranged. When the case is not in use, the handle foot 21 will be buried and hidden in the hollow sleeve 23. When the case is lifted, the handle foot 21 can slide in the hollow sleeve 23. Such movement can be achieved with the structures mentioned below.

First, the volume of the hollow chamber 11 in the hollow sleeve 23 is larger than the solid body of the handle foot 21.

Figure 3:
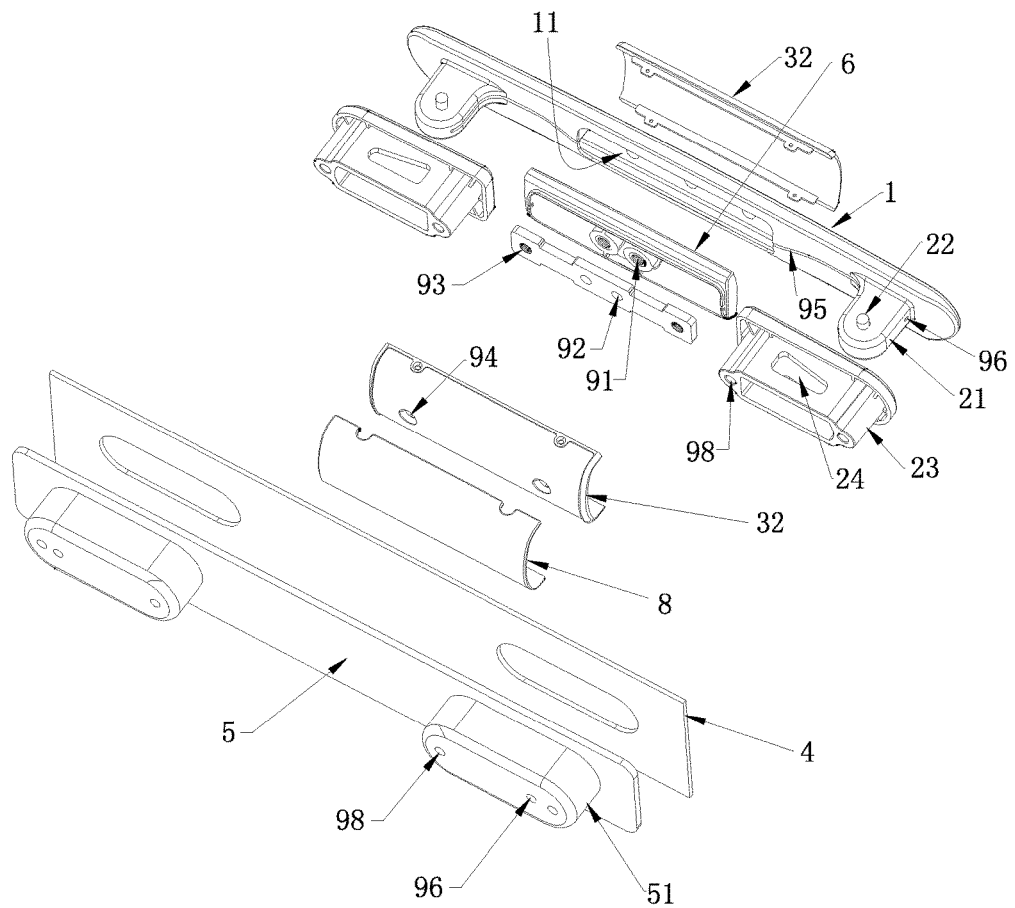
FIG. 3 is an exploded perspective view of the case holder according to a second embodiment of the present invention.

Second, the handle foot 21 has pin 22 extended outwards from the front side and back side thereof perpendicular to the front side or back side. The front side and back side are also called main surfaces. Referring to FIGS. 2 and 3, the side that faces the viewer is the front side, while the side back to the viewer is the back side, hereinafter. The hollow sleeve 23 has a slant linear guide groove 24 on the side wall thereof at the position corresponding to the pin 22. The pin 22 is placed through the guide groove 24 and allowed to slide back and forth along the direction of the long side of the guide groove.

Third, the hollow sleeve 23 also has a through hole 98 provided in the bottom side thereof. The hollow sleeve 23 can penetrate the case surface 4 to be embedded in the recess 51 that is on the stressed plate 5 that is arranged below the case surface 4 and be fixedly connected through self-tapping screw.

Therefore, when the case is lifted, the lifting bushing 3 is held by hand and upwardly pushed. This acting force is passed to the stressed plate 5 through the grip 1, the handle foot 21, the pin 22, the guide groove 24, and the hollow sleeve 23. Then the stressed plate 5 forces the whole case to upwardly move through the case surface 4. Conversely, the gravity force of the case acts on the fixed ends of the weighing sensor 7 in the opposite direction through the above mentioned parts and the fixing base 6, while the upward force of the hand holding on the lifting bushing 3 acts on the loading end of the weighing sensor 7. Here, an upward force and a downward force respectively to the loading end and the fixed end on the weighing sensor 7 makes the strain gauge arranged therebetween generate a straining signal. The signal is then transmitted to the external indication device through the connecting wire arranged in the guiding path that is arranged on the bottom side of the grip 1 and between the lifting arrangement 2 and the stressed plate 5, so as to read out the weight of the case. The indication device can be a LED displaying device or audio playing device arranged on other part of the body of the case.

The guiding path comprises a wire chase 95 arranged on the bottom side of the grip 1 and a blind hole 96 arranged on the handle foot 21, hollow sleeve 23, and stressed plate 5 and is composed by them. The connecting wire is the lead wire pass through the guiding path. In this way, the lead wire connected with the weighing sensor 7 is elicited by one or two ends of the case holder 100. Likewise, this structure can also avoid the issues of inaccuracy or assembling difficulty caused by complicated conduction structures of the prior art.

In order to provide a more comfortable feeling for the palm carrying the case, the outer surface of the lower portion 32 of the lifting bushing 3 provides a layer of handguard plate 8 thereon made of silicone. The handguard plate 8 can also fully cover on the outer surface of the upper portion 31 and the lower portion 32 of the lifting bushing 3.

Preferably, according to the present invention, the grip 1 is made of soft material. Therefore, besides that the fixing base 6 of the sensor uses hard material, the rest parts of the grip 1 use soft material. That is, parts besides of the fixing base 6 embedded in the grip 1 can become bent and deformed when the case with some weight is lifted and carried by hand. This structure can greatly improve its applicability. In other words, this structure can not only be applied to soft cases that are currently popular in the market, but also be applied to regular hard cases.

Embodiment 2

Referring to FIG. 3, the positions that the fixed ends and loading ends on the weighing sensor 7 are arranged and the position of the loading hole 94 on the lifting bushing 3 are different, comparing with embodiment 1, while the rest structures are the same. The two loading ends, according to this embodiment, are respectively located on the two ends of the weighing sensor 7, while the two fixed ends thereon are arranged adjacently and located in the middle of the weighing sensor 7. The position where the loading hole 94 on the lifting bushing 3 is arranged at is corresponding to the loading screw hole 93 on the loading end on the weighing sensor 7.

Embodiment 3

Figure 4:
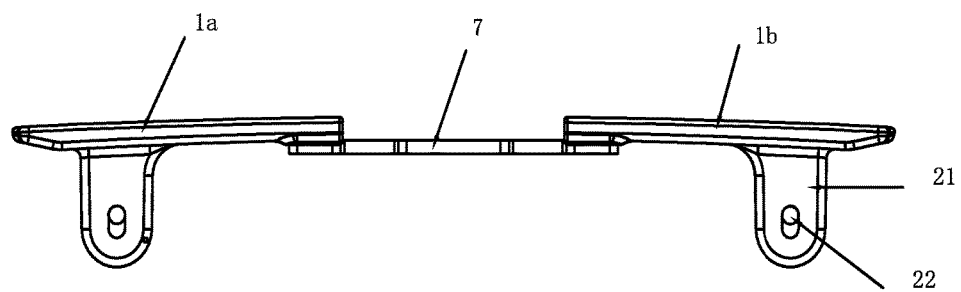
FIG. 4 is an elevation view of the case holder according to a third embodiment of the present invention.
Figure 5:
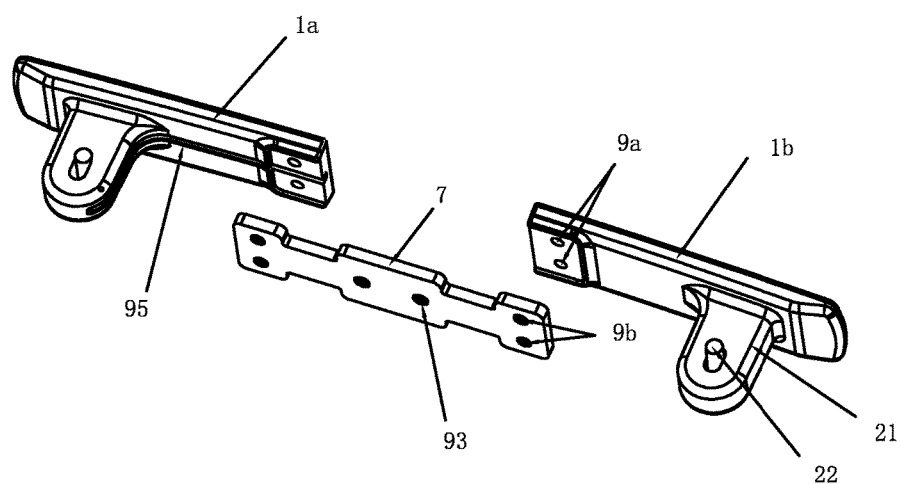
FIG. 5 is an exploded view of the case holder as shown in FIG. 4.

Referring to FIGS. 4 and 5, this embodiment illustrates an improvement of the grip 1, which structure is as follows.

The grip 1 is made of bendingly durable soft material and is composed of two separately arranged parts, which are respectively a left handle 1a and a right handle 1b. The lower surface of the outer ends of the left handle 1a and the right handle 1b provides a lifting arrangement 2 that is allowed to pass through the case surface 4 and to be fixedly connected with the stressed plate 5 below the case surface 4. The structure of the lifting arrangement 2 is the same as the lifting arrangement 2 illustrated in the previous two embodiments mentioned above.

The lower surface of the inner end of the left handle 1a and the right handle 1b provides fastening screw holes 9a thereon. A long strip shaped weighing sensor 7 is connected between the left handle 1a and the right handle 1b. The two fixed ends of the weighing sensor 7 are respectively located on the two ends thereof. The two loading ends of the weighing sensor 7 are both located in the middle thereof. The strain gauge is arranged between the fixed ends and the loading ends, which are the same as the weighing sensor 7 in embodiment 1 mentioned above.

The fixed ends provide screw holes 9b thereon at the positions corresponding to the fastening screw holes 9a. The left end of the weighing sensor 7 can be fixed on the left handle 1a and the right end of the weighing sensor 7 can be fixed on the right handle 1b by utilizing screws penetrating the screw holes 9b.

The loading end of the weighing sensor 7 is fixedly connected with a rigid and structurally closed lifting bushing 3 thereon. The lifting bushing 3 is arranged around the grip 1 and the weighing sensor 7.

The material and structure of the lifting bushing 3 and the way that the lifting bushing 3 connects the weighing sensor 7 is the same as what was illustrated in the first embodiment according to the present invention mentioned above.

The two ends of the lifting bushing 3 and the corresponding lifting arrangement 2 are separately arranged. There are gap reserved between the left handle 1a and the right handle 1b and the inner wall of the lifting bushing 3.

Further, a guiding path and a connecting wire for transmitting the weighing signal of the weighing sensor 7 to the external displaying device are arranged on the bottom side of the left handle 1a and the right handle 1b and between the lifting arrangement 2 and the stressed plate 5. The guiding path and the connecting wire are the same as what was illustrated in embodiment 1 according to the present invention mentioned above.

This embodiment omits the fixing base 6 of the previous two embodiments and splits the integral grip into two parts. Advantages of the structure include lower costs and ease to assembling.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A case holder with weighing sensor, comprising a grip and a lifting arrangement arranged at two ends of the lower surface of said grip and allowed to pass through a case surface to be fixedly connected with a stressed plate below said case surface, wherein a neutral zone of said grip provides a fixing base made of hard material for arranging a weighing sensor, wherein a fixed end of said weighing sensor is fixedly connected on said fixing base by screwing, wherein a loading end of said weighing sensor comprises a rigid and structurally closed lifting bushing fixedly connected thereon, wherein said lifting bushing is arranged around said grip, said fixing base, and said weighing sensor and has two ends separately arranged to said corresponding lifting arrangement, wherein the inner wall of said lifting bushing and said grip have a gap therebetween, wherein said case holder further comprises a guiding path and a connecting wire provided below said grip and between said lifting arrangement and said stressed plate and adapted for transmitting weighing signal of said weighing sensor to external displaying device.

2. The case holder with weighing sensor, as recited in claim 1, wherein said lifting bushing is made of metal or hard plastic material and has a shape selected from a group consisting of an elliptical shape, a round shape, and a combined shape of arc and rectangle for the cross-sectional shape thereof perpendicular to the axis thereof, wherein said lifting bushing comprises a detachable upper portion and lower portion, wherein the attaching sides of said upper portion and said lower portion symmetrically have screw orifices for the connection thereof with screw, wherein a median position of said lower portion has a loading hole adapted for fixing said lifting bushing on said weighing sensor by screwing.

3. The case holder with weighing sensor, as recited in claim 2, wherein said weighing sensor has a long rectangular shape and the two loading ends thereof are on the middle thereof and the two fixed ends thereof are respectively on the two ends thereof.

4. The case holder with weighing sensor, as recited in claim 2, wherein said weighing sensor has a long rectangular shape and the two loading ends thereof are respectively on the two ends thereof and the two fixed ends thereof are on the middle thereof.

5. The case holder with weighing sensor, as recited in claim 4, wherein the outer surface of said lower portion of said lifting bushing further provides a layer of handguard plate made of silicone.

6. The case holder with weighing sensor, as recited in claim 1, wherein said lifting arrangement comprises a handle foot integrally provided with said grip and a hollow sleeve allowing said handle foot to be buried and hidden therein, wherein the main surface of said handle foot has a pin perpendicular thereto and extending outwards, wherein the side wall of said hollow sleeve provides a slant linear guide groove at the position corresponding to said pin, wherein said pin is placed through said guide groove and allowed to slide back and forth along the direction of the long side of said guide groove, wherein the bottom side of said hollow sleeve has a screw orifice for fixing said hollow sleeve on said stressed plate by screwing.

7. The case holder with weighing sensor, as recited in claim 2, wherein said lifting arrangement comprises a handle foot integrally provided with said grip and a hollow sleeve allowing said handle foot to be buried and hidden therein, wherein the main surface of said handle foot has a pin perpendicular thereto and extending outwards, wherein the side wall of said hollow sleeve provides a slant linear guide groove at the position corresponding to said pin, wherein said pin is placed through said guide groove and allowed to slide back and forth along the direction of the long side of said guide groove, wherein the bottom side of said hollow sleeve has a screw orifice for fixing said hollow sleeve on said stressed plate by screwing.

8. The case holder with weighing sensor, as recited in claim 3, wherein said lifting arrangement comprises a handle foot integrally provided with said grip and a hollow sleeve allowing said handle foot to be buried and hidden therein, wherein the main surface of said handle foot has a pin perpendicular thereto and extending outwards, wherein the side wall of said hollow sleeve provides a slant linear guide groove at the position corresponding to said pin, wherein said pin is placed through said guide groove and allowed to slide back and forth along the direction of the long side of said guide groove, wherein the bottom side of said hollow sleeve has a screw orifice for fixing said hollow sleeve on said stressed plate by screwing.

9. The case holder with weighing sensor, as recited in claim 4, wherein said lifting arrangement comprises a handle foot integrally provided with said grip and a hollow sleeve allowing said handle foot to be buried and hidden therein, wherein the main surface of said handle foot has a pin perpendicular thereto and extending outwards, wherein the side wall of said hollow sleeve provides a slant linear guide groove at the position corresponding to said pin, wherein said pin is placed through said guide groove and allowed to slide back and forth along the direction of the long side of said guide groove, wherein the bottom side of said hollow sleeve has a screw orifice for fixing said hollow sleeve on said stressed plate by screwing.

10. The case holder with weighing sensor, as recited in claim 5, wherein said lifting arrangement comprises a handle foot integrally provided with said grip and a hollow sleeve allowing said handle foot to be buried and hidden therein, wherein the main surface of said handle foot has a pin perpendicular thereto and extending outwards, wherein the side wall of said hollow sleeve provides a slant linear guide groove at the position corresponding to said pin, wherein said pin is placed through said guide groove and allowed to slide back and forth along the direction of the long side of said guide groove, wherein the bottom side of said hollow sleeve has a screw orifice for fixing said hollow sleeve on said stressed plate by screwing.

11. The case holder with weighing sensor, as recited in claim 1, wherein said fixing base and said grip are fixedly connected by an embedding technique selected from the group consisting of injection molding technology, overmolding technology, and screw fastening structure.

12. The case holder with weighing sensor, as recited in claim 7, wherein said grip is made of soft or hard material.

13. The case holder with weighing sensor, as recited in claim 1, wherein said gap is at least 1 mm wide.

14. A case holder with weighing sensor, comprising a grip and a lifting arrangement arranged at an outer end of the lower surface of said grip and allowed to pass through a case surface to be fixedly connected with a stressed plate below said case surface, wherein said grip comprises a separately arranged left handle and right handle, wherein the lower surfaces of the inner ends of said left handle and said right handle have fastening screw holes, wherein said case holder further comprises a weighing sensor connected between said left handle and said right handle, wherein two fixed ends of said weighing sensor are respectively at the two ends of said weighing sensor and two loading ends thereof are at the middle thereof, wherein said fixed end has screw holes thereon as the position corresponding to said fastening screw holes, wherein said weighing sensor is fixedly connected on said grip by fastening screws through said screw holes, wherein a loading end of said weighing sensor comprises a rigid and structurally closed lifting bushing fixedly connected thereon, wherein said lifting bushing is arranged around said grip and said weighing sensor and has two ends separately arranged to said corresponding lifting arrangement, wherein the inner wall of said lifting bushing and said grip have a gap therebetween, wherein said case holder further comprises a guiding path and a connecting wire provided below said grip and between said lifting arrangement and said stressed plate and adapted for transmitting weighing signal of said weighing sensor to external displaying device.

* * * * *

UNITED STATES PATENT AND TRADEMARK OFFICE
CERTIFICATE OF CORRECTION

PATENT NO. : 10,145,724 B2
APPLICATION NO. : 15/379432
DATED : December 4, 2018
INVENTOR(S) : Xuefeng Guan It is certified that error appears in the above-identified patent and that said Letters Patent is hereby corrected as shown below:

On the Title Page

The Name of Assignee:
"Shenzhen Lanter Er Electronics, Company Limited"
Should be read:
-Shenzhen Lante Er Electronics, Company Limited-.

Signed and Sealed this
Sixteenth Day of April, 2019

Andrei Iancu
*Director of the United States Patent and Trademark Office*